United States Patent
Troxler

[15] 3,696,121
[45] Oct. 3, 1972

[54] 4-(2-HYDROXY-3-AMINO PROPOXY)-INDOLE DERIVATIVES

[72] Inventor: Franz Troxler, Bottmingen, Switzerland

[73] Assignee: Sandoz Ltd., Basel, Switzerland

[22] Filed: July 17, 1970

[21] Appl. No.: 55,945

[30] Foreign Application Priority Data

July 25, 1969  Switzerland............11365/69
May 26, 1970  Switzerland.............7795/70

[52] U.S. Cl..................260/326.15, 260/326.13 R, 260/326.16, 424/274
[51] Int. Cl.............................................C07d 27/56
[58] Field of Search................................260/326.15

[56] References Cited

UNITED STATES PATENTS 3,471,515  10/1969  Troxler et al.........260/326.15

Primary Examiner—Alex Mazel
Assistant Examiner—Joseph A. Narcavage
Attorney—Gerald D. Sharkin, Robert S. Honor, Frederick H. Weinfeldt, Richard E. Vila and Walter F. Jewell

[57]  ABSTRACT

The invention concerns new indol derivatives of the formula:

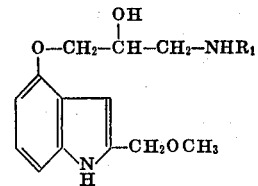

I wherein $R_1$ is lower alkyl, cycloalkyl of three or four carbon atoms, or 3-phenylpropyl, as well as processes for the production thereof.

The compounds have a blcoking effect on the vascular adrenergic β-receptors.

5 Claims, No Drawings

4-(2-HYDROXY-3-AMINO PROPOXY)-INDOLE DERIVATIVES

IMPROVEMENTS IN OR RELATING TO ORGANIC COMPOUNDS

The present invention relates to new indol derivatives of formula I,

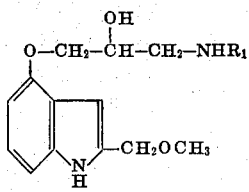

I wherein $R_1$ is lower alkyl, cycloalkyl of three or four carbon atoms, or 3-phenylpropyl,
as well as to processes for the production thereof.

The preferred compounds of Formula I, wherein $R_1$ is lower alkyl, are those in which the alkyl radical is branched or compact, especially those which are branched on the α-carbon atom, e.g., the isopropyl, sec.butyl, tert.butyl, 3-pentyl or tert.pentyl group.

In accordance with the invention the new compounds of formula I are obtained by
a. reacting 4-(2,3-epoxypropoxy)-2-methoxymethyl-indol of formula IIa,

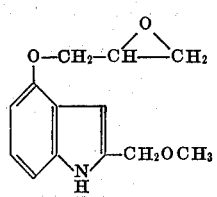

IIa or a compound of formula IIb,

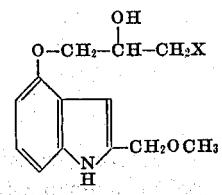

IIb wherein X is halogen,
or a mixture of the compound of formula IIa and a compound of formula IIb, hereinafter named compounds of formula II, with a compound of formula III,

    III wherein $R_1$ is as defined above, or
b. debenzylating by hydrogenation a compound of formula IV,

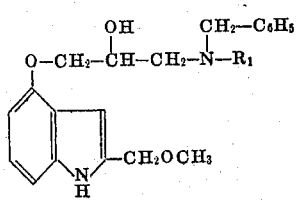

IV wherein $R_1$ is as defined above, or
c. hydrogenating a compound of formula V,

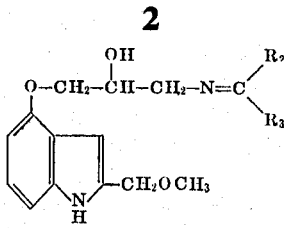

V wherein either each of $R_2$ and $R_3$ is lower alkyl having one to three carbon atoms,
or $R_2$ is hydrogen, and
$R_3$ is phenethyl,
or $R_2$ and $R_3$ together are trimethylene, to obtain a compound of formula Ia,

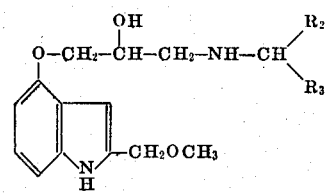

Ia wherein $R_2$ and $R_3$ are as defined above.

Acid addition salts of compounds I may be produced from free bases, and free bases from salts in conventional manner.

The production of the new compounds is described in more detail below:

a. The reaction of compounds of formula II with compounds of formula III in accordance with embodiment a) of the process of the invention is preferably effected in an inert organic solvent, e.g., an aromatic hydrocarbon such as benzene or toluene, or a cyclic ether such as dioxane, and has a duration of approximately 2 to 24 hours. The reaction temperature may range between 20° and 150° C; the reaction is preferably effected at the boiling temperature of the reaction mixture under reflux. In the compounds of formula IIb X preferably signifies chlorine or bromine.

b. In accordance with one method for carrying out embodiment b) of the process of the invention, the compounds of formula IV are conveniently hydrogenated in the presence of a catalyst, preferably a palladium catalyst, in an inert organic solvent, e.g., ethyl acetate, or a lower alkanol such as ethanol. Hydrogenation is preferably effected at room temperature and at normal pressure. After hydrogenation is complete, the catalyst is filtered off.

c. Reduction of the imines of formula V may, for example, be effected by hydrogenation in the presence of a suitable metal catalyst, preferably a palladium catalyst, in an inert organic solvent, e.g., ethyl acetate or a lower alkanol such as methanol. Hydrogenation is preferably effected at normal pressure and at room temperature. After hydrogenation is complete, the catalyst is filtered off.

in accordance with a further method for carrying out embodiment c) reduction is effected with a complex borohydride. For example, the imines of formula V are taken up in an inert organic solvent, e.g., a lower alkanol such as methanol, and solid sodium borohydride is added portionwise.

The reaction mixture obtained in accordance with process a), b) or c) may, for example, be worked up by concentrating by evaporation, shaking out the residue between an aqueous acid, e.g., 1 N tartaric acid or 1 N hydrochloric acid, and an organic solvent which is immiscible with the acid and inert under the reaction conditions, such as ethyl acetate, making the acid aqueous phase neutral, e.g., with an aqueous sodium carbonate solution, taking up the liberated basic products in an inert organic solvent such as methylene chloride and then concentrating the organic phase which has been separated and dried, by evaporation, preferably at reduced pressure.

The compounds of formula II are new. They may, for example, be produced by reacting 4-hydroxy-2-methoxymethyl-indol with epihalohydrins, preferably epichlorhydrin or epibromhydrin. 4-Hydroxy-2-methoxymethyl-indol is conveniently used as ammonium or alkali metal salt, e.g., as sodium salt, or is reacted with the epihalohydrin in the presence of a base such as piperidine.

After removing the excess epihalohydrin by distillation or completely concentrating the reaction mixture by evaporation, optionally in a vacuum, the residue (mixture of the compounds of formulas IIa and IIb) may be used as such for the next reaction without further purification.

Since epihalohydrin molecules have two reactive positions, a mixture of the compounds of formulas IIa and IIb is obtained, which, however, yields the same final product when used in process a). Therefore, it is not necessary to effect a separation of the mixture, although this may be readily effected (e.g., by chromatography).

The compounds of formula IV are likewise new. They may, for example, be produced by reacting a compound of formula VIa,

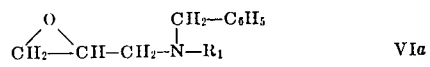   VIa wherein $R_1$ is as defined above, or a compound of formula VIb,

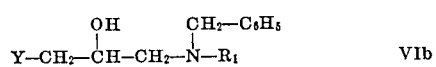   VIb wherein $R_1$ is as defined above, and Y is halogen, or a mixture of the compounds of formulas VIa and VIb, hereinafter named compounds of formula VI, with 4-hydroxy-2-methoxymethyl-indol.

The compounds of formula VIa may be produced in accordance with known processes, e.g., from compounds of formula VIb, by treatment with an alkali. The compounds of formula VIb may, for example, be obtained by reacting an amine of formula VII,

   VII wherein $R_1$ is as defined above, with an epihalohydrin, preferably at a temperature of about 20° to 120° C in an inert organic solvent, for example an aromatic hydrocarbon such as benzene or toluene.

The compounds of formula V are likewise new. They may, for example, be produced by debenzylating a compound of formula VIII,

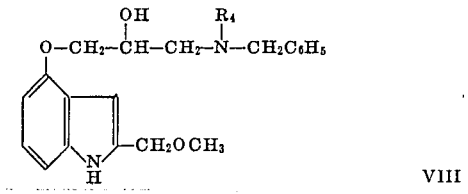   VIII wherein $R_4$ is hydrogen or benzyl, and reacting the resulting 4-(3-amino-2-hydroxypropoxy)-2-methoxymethyl-indol with the corresponding ketone or the corresponding aldehyde. After removing the excess aldehyde or the excess ketone by distillation, the resulting imines of formula V are used as such for the next reaction without further purification.

The removal of the benzyl radical(s) may, for example, be effected in a manner analogous to process b). The compounds of formula VIII may be produced as described in process a) for the production of compounds of formula I.

The hitherto unknown 4-hydroxy-2-methoxymethyl-indol, used as starting material, may be produced by etherifying 4-benzyloxy-2-hydroxymethyl-indol with diazomethane, in the presence of boron trifluoride, in an inert organic solvent, e.g., an open chain or cyclic ether, and subsequently debenzylating the resulting 4-benzyloxy-2-methoxymethyl-indol, e.g., as described in process b) for the production of compounds of formula Ia, by catalytic hydrogenation.

4-Benzyloxy-2-hydroxymethyl-indol may, for example, be obtained by reducing 4-benzyloxy-indol-2-carboxylic acid with a complex hydride of an alkali metal, such as lithium aluminum hydride or sodium dihydrobis-(2-methoxyethoxy) aluminate, in an inert solvent.

A cyclic or open chain ether such as dioxane or tetrahydrofuran is used as inert solvent for the reduction with the complex hydrides indicated above; reduction is preferably effected at the boiling temperature of the reaction mixture.

Insofar as the production of the starting materials is not described, there are known, or may be produced in accordance with known processes, or in a manner analogous to the process described herein, or to known processes.

The compounds of formula I and pharmaceutically acceptable acid addition salts thereof are useful because they possess pharmacological activity in animals. The compounds are useful in the treatment of coronary diseases, or more particularly in the treatment of angina pectoris and heart rhythm disorders, including tachycardia. This is indicated by the β-blocking activity of the compounds (blocking effect on the vascular, adrenergic β-receptors). The activity is illustrated by an inhibition of the positive inotropic adrenalin effect in the spontaneously beating guinea pig atrium, and furthermore by an inhibition of the hypotension caused by isoproterenol [1-(3 4-dihydroxyphenyl)-2-isopropylamino-ethanol] in the narcotized cat.

For the abovementioned use, the dosage administered will naturally vary depending on the compound employed, the mode of administration and the treatment desired. However, in general, satisfactory results are obtained at doses between about 0.004 and 0.6 mg/kg animal body weight. For the larger mammals, the total daily dose is in the range of from about 10 to about 400 milligrams of the compound. The daily dose may be given in divided doses two to three times a day, or in sustained release form. Dosage forms suitable for oral administration comprise from about 3 to about 200 milligrams of the compound admixed with a solid or liquid pharmaceutical carrier or diluent.

In the following Examples which illustrate the invention without in any way limiting its scope, all temperatures are indicated in degrees Centigrade and are uncorrected.

EXAMPLE 1

4-(2-Hydroxy-3-isopropylaminopropoxy)-2-methoxymethyl-indol

A solution of 8.3 g of 4-hydroxy-2-methoxymethyl-indol in 35 cc of dioxane is added while stirring and in an atmosphere of nitrogen to a solution of 1.92 g of sodium hydroxide in 35 cc of water, and 8.9 g of epichlorhydrin are subsequently added. The reaction mixture is stirred at room temperature for a further 24 hours, is extracted 4 times with methylene chloride, and the combined organic layers which have been dried over magnesium sulphate are concentrated by evaporation at reduced pressure.

10.6 g of the oily residue are heated to the boil for 6 hours with 25 cc of isopropyl amine in 75 cc of dioxane. The reaction mixture is subsequently evaporated to dryness at reduced pressure, the residue is shaken out thrice between ethyl acetate and a 1 N tartaric acid solution, and a 5 N sodium hydroxide solution is added to the combined tartaric acid phases until an alkaline reaction is obtained. Extraction is subsequently effected four times with methylene chloride, and the combined organic layers which have been dried over magnesium sulphate are concentrated by evaporation at reduced pressure. The title compound crystallizes from ethyl acetate in needles having a M.P. of 114°–116°.

Keller's color reaction (0.2 mg): dark violet,
Van Urk's color reaction (1mg) : violet.

The 4-hydroxy-2-methoxymethyl-indol (oily), used as starting material, is obtained by debenzylation of 4-benzyloxy-2-methoxymethyl-indol (M.P. 84°–86° from ether) with hydrogen in the presence of a 5 percent palladium catalyst on aluminum oxide. 4-Benzyloxy-2-methoxymethyl-indol is produced by etherification of 4-benzyloxy-2-hydroxymethyl-indol (M.P. 109°–111° from benzene) with diazomethane in the presence of boron trifluoride etherate in ethereal solution. 4-Benzyloxy-2-hydroxymethyl-indol is obtained by reduction of 4-benzyloxy-indol-2-carboxylic acid with lithium aluminum hydride in boiling dioxane.

EXAMPLE 2

4-(2-Hydroxy-3-isopropylaminoproxy)-2-methoxymethyl-indol

This compound is obtained in a manner analogous to that described in Example 1, except that epifluorhydrin is used in place of epichlorhydrin. The title compound which is identical with the product produced in accordance with Example 1, is obtained. M.P. 114°–116° C after crystallization from ethyl acetate.

EXAMPLE 3:

4-(2-Hydroxy 3-isopropylaminoproxy)-2-methymethyl-indol

This compound is obtained in a manner analogous to that described in Example 1, except that epiiodhydrin is used in place of epichlorhydrin. The title compound which is identical with the product produced in accordance with Example 1, is obtained. M.P. 114°–116° C after crystallization from ethyl acetate.

EXAMPLE 4

4-(2-Hydroxy-3-isopropylaminopropoxy)-2-methoxymethyl-indol 20 g of 4-hyroxy-2-methoxymethyl-indol, 150 cc of epichlorhydrin and 3 drops of piperidine are heated to the boil for 5 hours. The excess epichlorhydrin is removed by distillation at reduced pressure and the resulting residue is reacted with isopropyl amine as described in Example 1. The title compound which is identical with the product produced in accordance with Example 1, is obtained. M.P. 114°–116° after crystallization from ethyl acetate.

EXAMPLE 5

4-(2-Hydroxy-3-isopropylaminopropoxy)-2-methoxymethyl-indol

This compound is obtained in a manner analogous to that described in Example 4, except that epibromhydrin is used in place of epichlorhydrin. The title compound which is identical with the product produced in accordance with Example 1, is obtained. M.P. 114°–116° after crystallization from ethyl acetate.

The production methods described in Examples 1 to 5 are repeated, except that the corresponding compound of formula II and compound of formula III is used as starting material in each case, whereby the following compounds of formula I are obtained:

| Compound of formula I | $R_1$ | M.P. | Recrystallization solvent |
| --- | --- | --- | --- |
| Example 6 | tert.butyl | 106°–107° | ethyl acetate |
| Example 7 | cyclopropyl | 95°–97° | ether / petroleum ether |
| Example 8 | 3-pentyl (oxalate) | 152°–154° | ethanol / ethyl acetate |

EXAMPLE 9

4-(2-Hydroxy-3-isopropylaminopropoxy)-2-methoxymethyl-indol 4.8 g of 1-(N-benzylisopropylamino)-3-chloro-2-propanol are added to a solution of 1.77 g of 4-hydroxy-2-methoxymethyl-indol and 0.4 g of sodium hydroxide in 150 cc of methanol, and the mixture is heated to the coil for 20 hours. The solvent is removed by evaporation at reduced pressure, the residue is triturated several times with petroleum ether and is finally shaken out between water and ethyl acetate. The combined ethyl acetate phases which have been dried over magnesium sulphate are concentrated by evaporation at reduced pressure.

The resulting amorphous 4-[3-(N-benzylisopropylamino)-2-hydroxypropoxy]-2-methoxymethyl-indol is taken up in 100 mg of methanol, and after the addition of 1 g of a palladium catalyst (5 percent of palladium on aluminum oxide) shaking is effected with hydrogen until the taking up of hydrogen is complete.

The catalyst is filtered off, the filtrate is evaporated to dryness at reduced pressure, and the title compound is isolated as described in Example 1 by shaking out between ethyl acetate and a 1 N tartaric acid solution, making the combined tartaric acid phases alkaline and concentrating the dried organic layers by evaporation at reduced pressure. M.P. 114°–116° after crystallization from ethyl acetate.

The 1-(N-benzylisopropylamino)-3-chloro-2-propanol used as starting material may, for example, be produced as follows:

A mixture of 18.4 g of epichlorhydrin and 29.8 g of N-benzylisopropyl amine in 100 cc of benzene is heated to the boil at reflux for 24 hours, the solvent is subsequently evaporated and the residue is distilled in a high vacuum; 1-(N-benzylisopropylamino)-3-chloro-2-propanol, having a B.P. of 110°–115°/0.2 mm of Hg, is obtained.

EXAMPLE 10

4-(2-Hydroxy-3-isopropylaminopropoxy)-2-methoxymethyl-indol 4-(3-Dibenzylamino-2-hydroxypropoxy)-2-methoxymethyl-indol is obtained as a resin, using dibenzyl amine in place of isopropyl amine in the process described in Example 1.

3 g of a palladium catalyst (5 percent of palladium on charcoal) are added to 10 g of this crude product without further purification, and shaking is effected in 100 cc of methanol with hydrogen until the taking up of hydrogen is complete. The catalyst is filtered off and the solvent is evaporated at reduced pressure. The resulting amorphous 4-(3-amino-2-hydroxypropoxy)-2-methoxymethyl-indol is then taken up in 50 cc of acetone and is allowed to stand at room temperature for 24 hours. The reaction solution is subsequently evaporated to dryness at reduced pressure and at room temperature, the residue is dissolved in 100 cc of methanol, and after the addition of 5 g of a palladium catalyst (5 percent of palladium on aluminum oxide) shaking is effected with hydrogen until the taking up of hydrogen is complete. The reaction mixture is evaporated to dryness at reduced pressure, and the title compound is subsequently isolated as described in Example 1. M.P. 114°–116° after crystallization from ethyl acetate.

What is claimed is:

1. A compound of the formula:

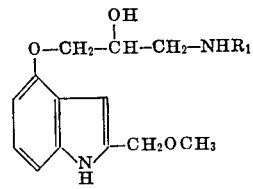

wherein $R_1$ is lower alkyl, cycloalkyl of three or four carbon atoms, or 3-phenylpropyl, or a pharmaceutically acceptable acid addition salt thereof.

2. The compound of claim 1, which is 4-(2-hydroxy-3-isopropylamino-propoxy)-2-methoxymethyl-indol.

3. The compound of claim 1, which is 4-(3-tert.butylamino-2-hydroxy-propoxy)-2-methoxymethyl-indol.

4. The compound of claim 1, which is 4-(3-cyclopropylamino-2-hydroxy-propoxy)-2-methoxymethyl-indol.

5. The compound of claim 1, which is 4-[2-hydroxy-3-(3-pentyl)-amino-propoxy]-2-methoxymethyl-indol.

* * * * *